United States Patent
Brandt et al.

(10) Patent No.: US 8,776,137 B2
(45) Date of Patent: Jul. 8, 2014

(54) SYSTEM AND METHODS FOR DIGITAL VIDEO RECORDER BACKUP AND RECOVERY

(75) Inventors: Jeffrey L. Brandt, Cedar Park, TX (US); Marc A. Sullivan, Austin, TX (US); Douglas R. Reynolds, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1259 days.

(21) Appl. No.: 11/837,134

(22) Filed: Aug. 10, 2007

(65) Prior Publication Data

US 2009/0044233 A1 Feb. 12, 2009

(51) Int. Cl.
- *H04N 21/4425* (2011.01)
- *H04N 7/173* (2011.01)
- *H04N 21/472* (2011.01)

(52) U.S. Cl.
USPC ................. 725/58; 725/87; 725/145; 726/28

(58) Field of Classification Search
CPC .......... H04N 21/2747; H04N 21/4334; H04N 21/47202; H04N 21/47214
USPC ........... 375/240.26; 725/86–87, 91, 125, 145; 726/2, 27, 28
See application file for complete search history.

(56) References Cited

U.S. PATENT DOCUMENTS

| | | | |
|---|---|---|---|
| 6,769,127 B1* | 7/2004 | Bonomi et al. | 725/39 |
| 7,065,778 B1* | 6/2006 | Lu | 725/98 |
| 7,080,400 B1 | 7/2006 | Navar | |
| 7,805,613 B2* | 9/2010 | Apfelbaum | 713/185 |
| 7,805,741 B2* | 9/2010 | Yeh | 725/37 |
| 7,978,720 B2* | 7/2011 | Russ et al. | 370/419 |
| 8,006,275 B1* | 8/2011 | Poole et al. | 725/96 |
| 8,024,766 B2* | 9/2011 | Addington | 725/116 |
| 8,132,218 B2* | 3/2012 | Six et al. | 725/86 |
| 8,139,924 B2* | 3/2012 | Walters et al. | 386/328 |
| 8,250,614 B1* | 8/2012 | Ellis et al. | 725/87 |
| 2002/0154892 A1* | 10/2002 | Hoshen et al. | 386/87 |
| 2002/0184638 A1* | 12/2002 | Agnihotri et al. | 725/89 |
| 2004/0101271 A1* | 5/2004 | Boston et al. | 386/46 |
| 2004/0110468 A1* | 6/2004 | Perlman | 455/13.3 |
| 2004/0151474 A1* | 8/2004 | Suh | 386/83 |
| 2004/0268420 A1* | 12/2004 | Addington et al. | 725/146 |
| 2005/0108769 A1* | 5/2005 | Arnold et al. | 725/115 |
| 2005/0120386 A1* | 6/2005 | Stone | 725/134 |
| 2005/0193023 A1* | 9/2005 | Ismail | 707/200 |
| 2005/0216942 A1* | 9/2005 | Barton | 725/97 |
| 2005/0240694 A1 | 10/2005 | Tseng et al. | |
| 2005/0275758 A1* | 12/2005 | McEvilly et al. | 348/725 |
| 2006/0075441 A1* | 4/2006 | Gauba et al. | 725/89 |
| 2006/0085817 A1* | 4/2006 | Kim et al. | 725/34 |
| 2006/0127037 A1 | 6/2006 | Van Hoff et al. | |
| 2006/0127039 A1* | 6/2006 | van Stam | 386/94 |

(Continued)

*Primary Examiner* — Nadia Khoshnoodi
*Assistant Examiner* — Theodore Parsons
(74) *Attorney, Agent, or Firm* — Guntin & Gust, PLC; Jay H. Anderson

(57) ABSTRACT

A system that incorporates teachings of the present disclosure may include, for example, a method for receiving a user input identifying a video signal, recording the video signal to the video data file and sending an instruction to a backup server. The instruction causes the backup server to concurrently record the video signal to a second video data file. The backup server can also record a second video signal to a second video data file based on a second instruction. Other embodiments are disclosed.

18 Claims, 7 Drawing Sheets

(56) References Cited

U.S. PATENT DOCUMENTS

| | | | |
|---|---|---|---|
| 2006/0130107 A1* | 6/2006 | Gonder et al. | 725/110 |
| 2006/0161635 A1* | 7/2006 | Lamkin et al. | 709/217 |
| 2006/0248553 A1* | 11/2006 | Mikkelson et al. | 725/23 |
| 2006/0282847 A1* | 12/2006 | Gupte | 725/25 |
| 2007/0009235 A1* | 1/2007 | Walters et al. | 386/112 |
| 2007/0039033 A1 | 2/2007 | Ota | |
| 2007/0133953 A1 | 6/2007 | Fontijn et al. | |
| 2007/0143809 A1 | 6/2007 | Chen et al. | |
| 2007/0255913 A1* | 11/2007 | Weaver | 711/162 |
| 2008/0016196 A1* | 1/2008 | MacMillan et al. | 709/223 |
| 2008/0022304 A1* | 1/2008 | Prus et al. | 725/39 |
| 2008/0134258 A1* | 6/2008 | Goose et al. | 725/91 |
| 2008/0141309 A1* | 6/2008 | Barsness | 725/58 |
| 2008/0209491 A1* | 8/2008 | Hasek | 725/114 |
| 2009/0010610 A1* | 1/2009 | Scholl et al. | 386/68 |
| 2009/0300673 A1* | 12/2009 | Bachet et al. | 725/31 |
| 2009/0300697 A1* | 12/2009 | Hielscher et al. | 725/114 |
| 2010/0023976 A1* | 1/2010 | Coles et al. | 725/82 |
| 2012/0308191 A1* | 12/2012 | Chung et al. | 386/200 |

\* cited by examiner

SYSTEM AND METHODS FOR DIGITAL VIDEO RECORDER BACKUP AND RECOVERY

FIELD OF THE DISCLOSURE

The present disclosure generally relates to digital video recorders, and more particularly relates to backup and recovery of video data files.

BACKGROUND

Digital Video Recorders (DVRs) allow consumers to record television programs aired at one time and view the television program at another time. Typically, DVRs employ hard drives to store many hours of recorded programming until later viewed by the consumer. Reliability of the DVR is of high importance, especially for achieving high customer satisfaction. However, hard drives may malfunction resulting in a loss of the stored programming. Additionally, the hard disk in a DVR is typically active for long durations, potentially increasing the likelihood of failure.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Embodiments discussed below describe, in part a system and methods for backup and recovery of video data files recorded by a DVR.

Figure 1:
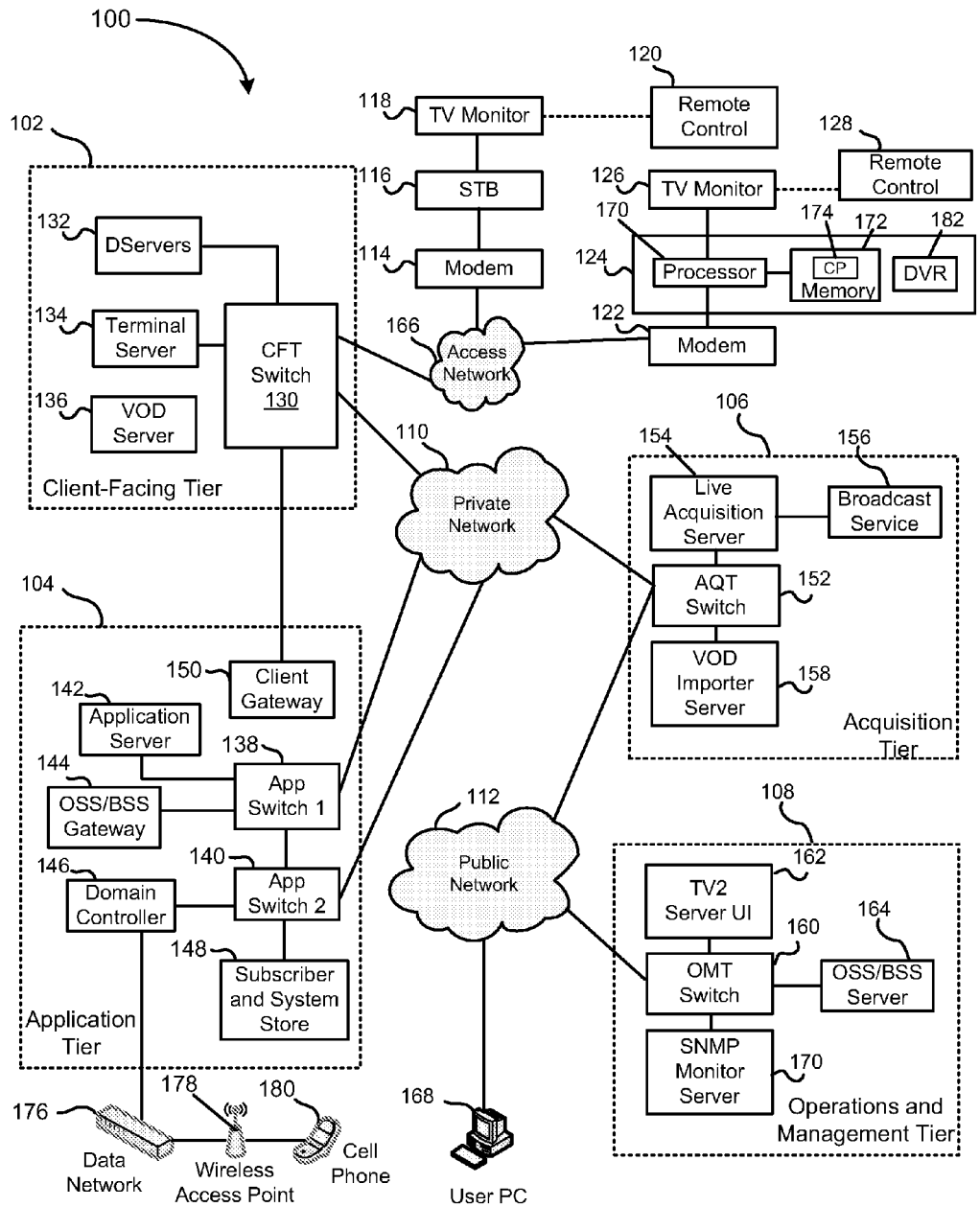
FIG. 1 is a block diagram illustrating an embodiment of an Internet Protocol Television (IPTV) system.

FIG. 1 shows an IPTV system 100 including a client facing tier 102, an application tier 104, an acquisition tier 106, and an operations and management tier 108. Each tier 102, 104, 106, 108 is coupled to a private network 110, a public network 112, or both the private network 110 and the public network 112. For example, the client-facing tier 102 can be coupled to the private network 110. Further, the application tier 104 can be coupled to the private network 110 and to the public network 112, such as the Internet. The acquisition tier 106 can also be coupled to the private network 110 and to the public network 112. Moreover, the operations and management tier 108 can be coupled to the public network 112.

The various tiers 102, 104, 106, 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems, such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes, such as the representative set-top boxes 116, 124, over a wide geographic area, such as a regional area, a metropolitan area, a viewing area, or any other suitable geographic area that can be supported by networking the client-facing tier 102 to numerous set-top box devices.

In one embodiment, the client-facing tier 102 can be coupled to the modems 114, 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the private access network 166, via an IPTV software platform, such as Microsoft® TV IPTV Edition.

Additionally, the first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116, 124 can receive data or video from the client-facing tier 102 via the private access network 166 and render or display the data or video at the display device 118, 126 to which it is coupled. In an illustrative embodiment, the set-top box devices 116, 124 can include tuners, such as the tuner 184 shown in FIG. 1, that receive and decode television programming information for transmission to the display devices 118, 126. Further, the set-top box devices 116, 124 can include a STB processor 178 and a STB memory device 180 that is accessible to the STB processor 178. In a particular embodiment, the set-top box devices 116, 124 can also communicate commands received from the remote control devices 120, 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server 168 and other devices with a common connection point to the private network 110. In a particular embodiment, the CFT switch 130 can also be coupled to a video-on-demand (VOD) server 136.

As shown in FIG. 1, the application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116, 124 via the private access network 166, so the set-top box devices 116, 124 can provide functions, such as display, messaging, processing of IPTV data and VOD material, etc. In a particular embodiment, the OSS/BSS gateway 144 includes operation systems and support (OSS) data, as well as billing systems and support (BSS) data.

Further, the second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116, 124 can access the system via the private access network 166, using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when a set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, e.g., because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110.

The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 can transmit the television content to the AQT switch 152, in turn, and the AQT switch 152 can transmit the television content to the CFT switch 130 via the private network 110. Further, the television content can be encoded at the D-servers 132, and the CFT switch 130 can communicate the television content to the modems 114, 122 via the private access network 166. The set-top box devices 116, 124 can receive the television content from the modems 114, 122, decode the television content, and transmit the content to the display devices 118, 126 according to commands from the remote control devices 120, 128.

Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When a user issues a request for VOD content to a set-top box device 116, 124, the request can be transmitted over the private access network 166 to the VOD server 136, via the CFT switch 130. Upon receiving such a request, the VOD server 136 can retrieve requested VOD content and transmit the content to the set-top box device 116,124 across the private access network 166, via the CFT switch 130. In an illustrative embodiment, the live acquisition server 154 can transmit the television content to the AQT switch 152, and the AQT switch 152, in turn, can transmit the television content to the OMT switch 160 via the public network 112. In this embodiment, the OMT switch 160 can transmit the television content to the TV2 server 162 for display to users accessing the user interface at the TV2 server 162. For example, a user can access the TV2 server 162 using the computer 176 coupled to the public network 112.

The domain controller 146 communicates with the public network 112 via the second APP switch 140. Additionally, the domain controller 146 can communicate via the public network 112 with one or more user personal computers (PCs) 168. For example, the domain controller 146 can display a web portal via the public network 112 and allow users to access the web portal using a PC 168. Further, in an illustrative embodiment, the domain controller 146 can communicate with at least one wireless network access point 178 over a data network 176. In this embodiment, each wireless network access device 178 can communicate with user wireless devices, such as a cellular phone 180.

In a particular embodiment, a set-top box device, such as the second set-top box device 124, can include a STB processor 170 and a STB memory device 172 that is accessible to the STB processor 170. The set-top box device 124 also includes a STB computer program 174 that is embedded within the STB memory device 172. In a particular embodiment, the STB computer program 174 can contain instructions to receive and execute at least one user television viewing preference that a user has entered by accessing an Internet user account via the domain controller 146.

For example, the user can use the PC 168 to access a web portal maintained by the domain controller 146, via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124, by associating the user account with an IP address of the second set-top box device 124, with data relating to one or more twisted pairs connected with the second set-top box device 124, with data related to one or more fiber optic cables connected with the second set-top box device 124, with an alphanumeric identifier of the second set-top box device 124, with any other data that is suitable for associating second set-top box device 124 with a user account, or with any combination of these.

The STB computer program 174 can contain instructions to receive many types of user preferences from the domain controller 146 via the access network 166. For example, the STB computer program 174 can include instructions to receive a request to record at least one television program at a DVR 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular phone 180. The message can be received at the CFT switch 130, for instance, and communicated to the domain controller 146 across the private network 110, via the second APP switch 140. Further, the domain controller 146 can transmit the message to the wireless data network 176, directly or via the public network 112, and on to the wireless network access point 178. The message can then be transmitted to the cellular phone 180. In an illustrative embodiment, the status can be sent via a wireless access protocol (WAP).

Figure 2:
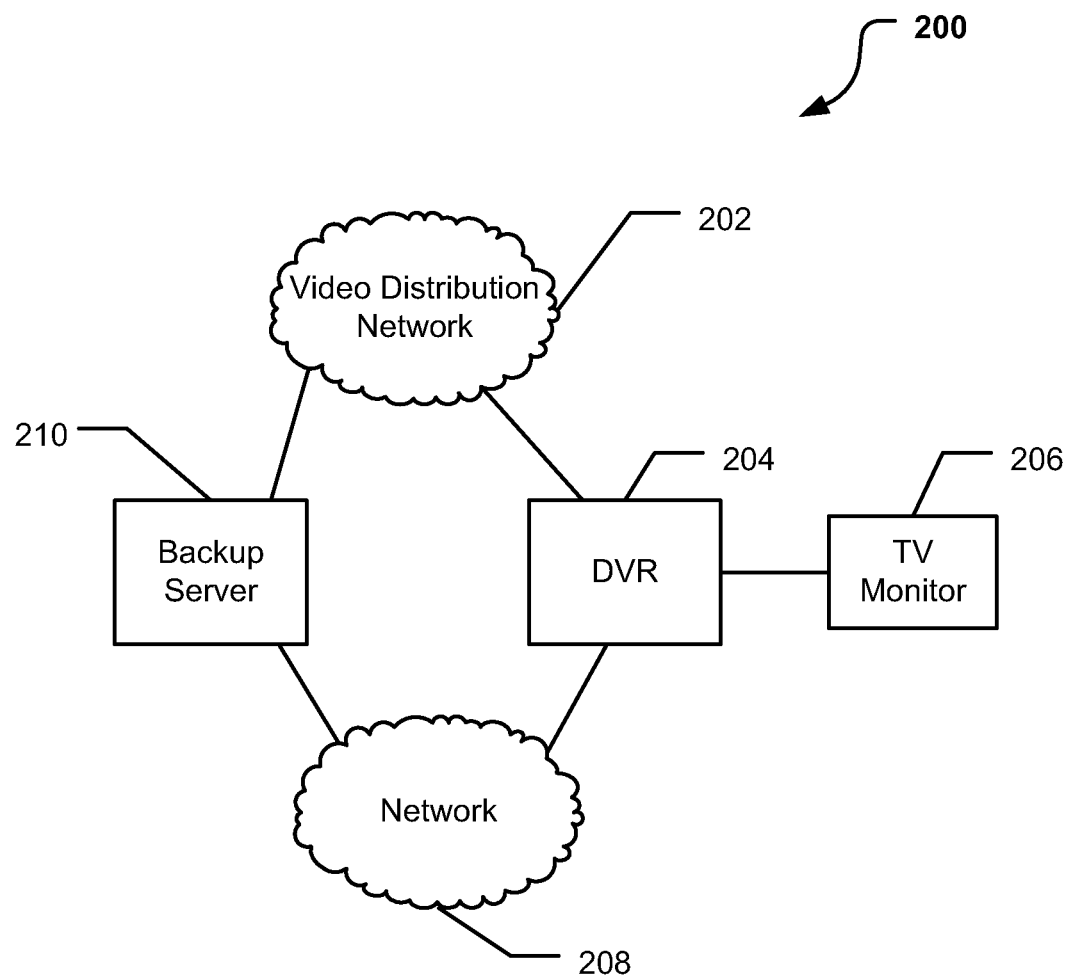
FIG. 2 is a block diagram illustrating an embodiment of a DVR backup and recovery system.

FIG. 2 shows a system 200 for backing up video data files stored on a DVR. As shown, the system 200 can include a video distribution network 202 for delivering video signals to a DVR 204. The video distribution network can for example be an IPTV network, a cable TV network, a satellite TV network, or an over-the-air broadcast network. The video signals can for example be digital video signals, analog video signals, or a combination thereof. The DVR 204 can process the video signals and output a processed video signal to a TV monitor 206. Additionally, the DVR 204 can be connected to a communication network 208, such as an IP network. The DVR 204 can communicate with a backup server 210 through the communication network 208. A backup server 210 can be connected to the video distribution network 202 to receive the video signals. The video distribution network and the communication network can be the same network. For example, the video distribution and communication can occur on the same IP network. Alternatively, the video distribution network and the communication network can be separate networks.

Figure 3:
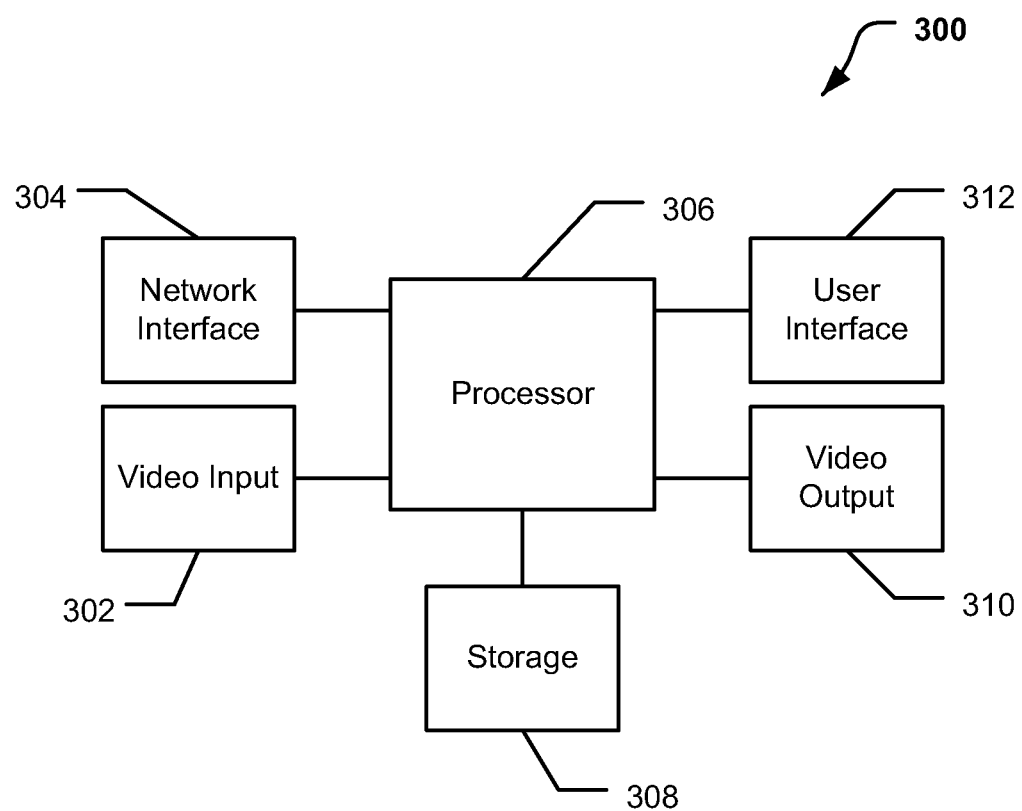
FIG. 3 is a block diagram illustrating an embodiment of a DVR.

FIG. 3 shows a DVR system 300 including a video input 302, a network interface 304, a processor 306, a storage 308, a video output 310, and a user interface 312. The system 300 can connect to a video distribution network through the video input 302. The system 300 can connect to a communication network through the network interface 304. The network interface 304 can be wired or wireless. A display, such as a TV monitor, can be connected to the video output 310.

The system 300 can receive a video signal through the video input 302. The processor 306 can process the video signal to provide a processed video signal or a video data file. The processed video signal can be sent to the display through the video output 310. The video data file can be stored within the storage 308. The storage 308 can be an optical storage, a magnetic storage, a solid-state storage, or any combination thereof. Alternatively, the processor can process a video data file to provide a processed video signal to be displayed. The user interface 312, such a remote control, can allow a user to select a video stream to view, a video stream to record, or a video data file to view.

Figure 4:
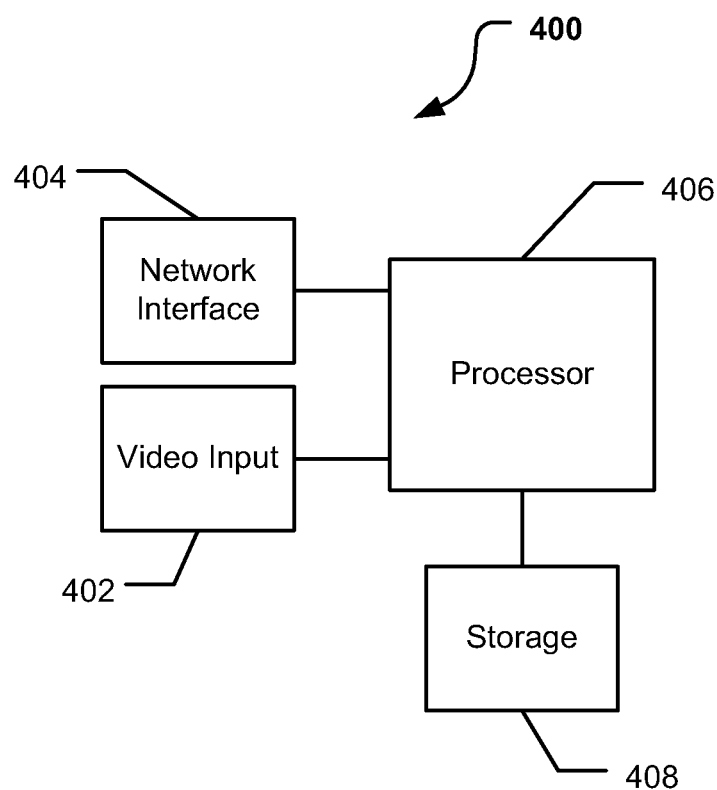
FIG. 4 is a block diagram illustrating an embodiment of a DVR backup server.

FIG. 4 shows a backup server 400 including a video input 402, a network interface 404, a processor 406, and a storage 408. The system 400 can connect to a video distribution network through the video input 402. The system 400 can connect to a communication network through the network interface 404. The network interface 404 can be wired or wireless. The server 400 can receive a video data file from a DVR through the communications network and store the data file in the storage 408. The storage 408 can be an optical storage, a magnetic storage, a solid-state storage, or any combination thereof. The server 400 can receive a video signal from the video distribution network. The processor 406 can process the video signal to provide a video data file to be saved in the storage 408. Further, the server can send a video data file from the storage 408 to a DVR through the communication network.

Figure 5:
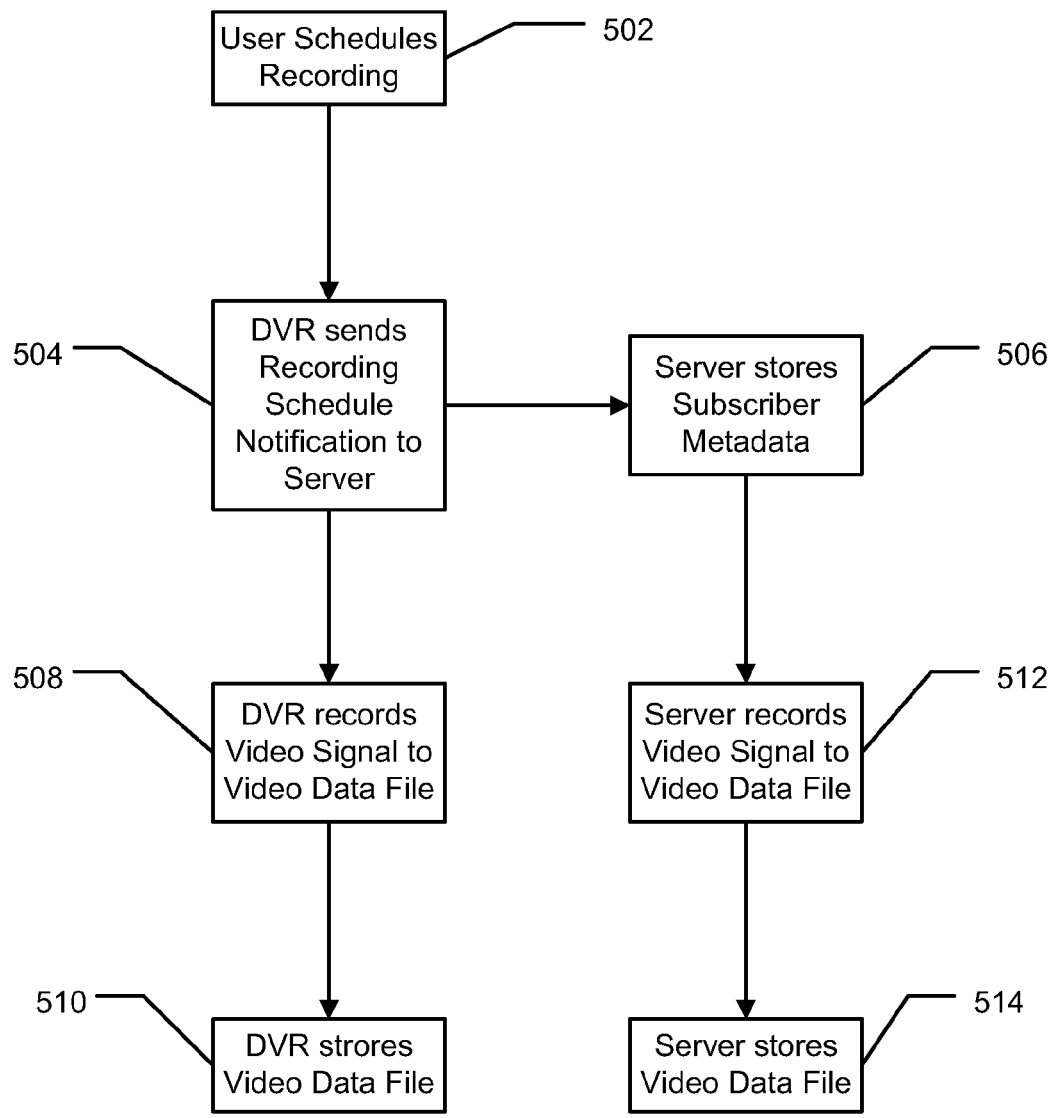
FIG. 5 is a flow diagram illustrating a method of backing up a video data file.

FIG. 5 illustrates a method of backing up a video data file recorded by a DVR. At 502, a user can select a program to be recorded. The DVR can send a recording schedule notification to the server, as illustrated at 504. The recording schedule notification can provide the server with details about the program, such as a channel and a time. Additionally, the recording schedule notification can contain subscriber information to identify the requester of the recording. Illustrated at 506, the server can store subscriber metadata. The subscriber metadata can include the program information and the subscriber information. The subscriber metadata can be used to provide access control to a video data file. Additionally, the subscriber metadata can allow more than one subscriber to access the video data file to reduce storage requirements. Specifically, when multiple subscribers select to record the same program and the backup server can store one video data file and provide the multiple subscribers with access to the same video data file.

In an exemplary embodiment, the subscriber metadata can be a database including subscriber information, video data file information, and access information. The video data file information can include program information related to the video data file and information to identify the video data file.

The access information can include which subscribers have access to which video data files. In an alternate embodiment, the subscriber metadata can be metadata included with the video data file and include program information and access information. In yet another embodiment, the subscriber metadata can be a subscriber data file that includes subscriber information and access information. At 508, the DVR can record the video signal to a video data file. The DVR can store the video data file within the DVR storage, as illustrated at 510. At 512, the server can record the video signal to a second video data file, concurrently with 508. The server can store the second video data file within the server storage.

Figure 6:
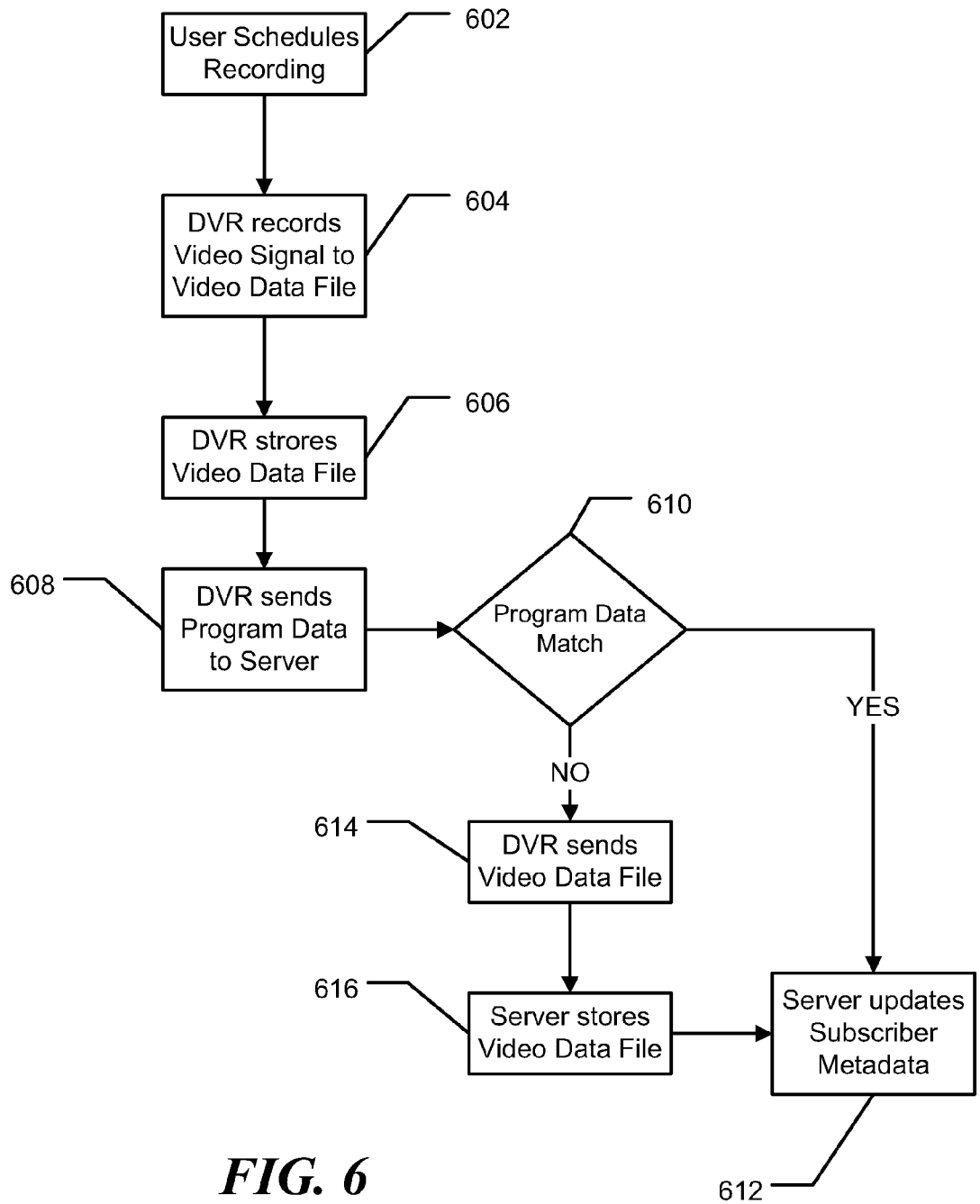
FIG. 6 is a flow diagram illustrating an alternate method of backing up a video data file.

FIG. 6 illustrates an alternate method of backing up a video data file recorded by a DVR. Illustrated at 602, a user can select a program to be recorded. At 604, the DVR can record the video signal to a video data file. The DVR can store the video data file within the DVR storage, as illustrated at 510. The DVR can send program data to the server, as illustrated at 608. At 610, the server can compare the program data to the program data for video data files stored on the server. In an exemplary embodiment, the program data can be compared to the program data for all video data files including video data files recorded by another subscriber. The server can allow multiple subscribers to access the same video data file. In an alternate embodiment, the program data can be compared to the program data for video data files stored for the subscriber.

If the program data matches an existing video data file, the server can update the subscriber metadata to indicate that the existing video data file is accessible by the DVR, as illustrate at 612. Allowing multiple subscribers to access the same video data file allows for decreased network overhead and storage requirements. Alternatively, if the program data does not match program data for an existing video data file, the server can request the video data file from the DVR. At 614, the DVR sends the video data file to the server. Illustrated at 610, the server stores the video data file. The server can update the subscriber metadata to indicate the DVR can access to the video data file, as illustrated at 612. The subscriber metadata can include the program information and the subscriber information.

Figure 7:
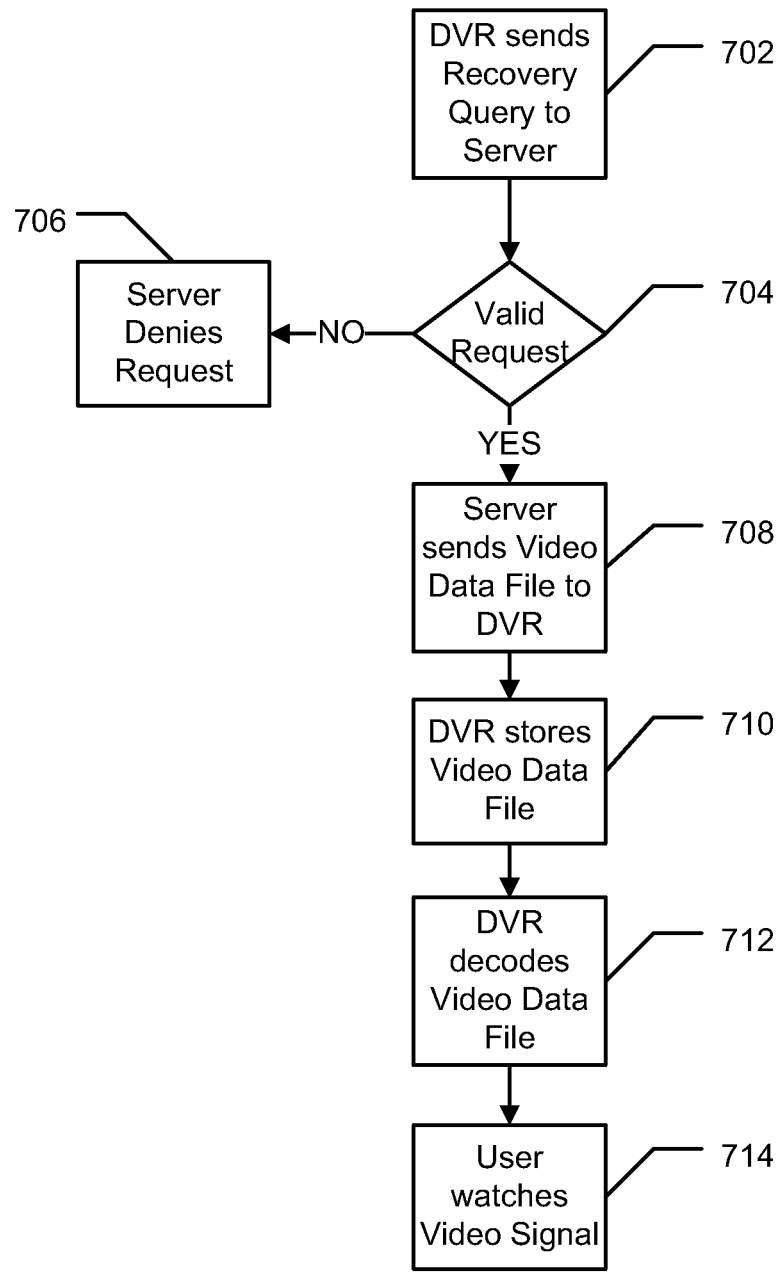
FIG. 7 is a flow diagram illustrating a method of recovery of a video data file.

FIG. 7 illustrates a method of restoring a lost video data file to a DVR. The video data file can be lost through user error, such as accidental deletion. Alternatively, the video data file can be lost through hardware failure, such as a hard drive failure. Further, the video data file can be lost when a DVR is replaced, such as when changing providers or upgrading the DVR. As illustrated at 702, the DVR can send a recovery query to the server. The recovery query can include subscriber information and program information. In an exemplary embodiment, a user may initiate the recovery. For example, the DVR may display information about the video data files stored on the server and not currently stored on the DVR. The user can select a program and the DVR can send the recovery query.

In an alternate embodiment, the recovery may occur automatically. For example, after replacement of a failed hard drive or a replacement of the DVR, the DVR may initiate a recovery of one or more video data files stored on the server.

In yet another embodiment, the video data file stored on the DVR may be corrupt or incomplete. For example, a power outage or service interruption may cause the DVR to miss a portion of the video signal. Alternatively, the video data file may be corrupted due to a bad block on the hard drive. The user can select a program stored on the DVR and the DVR can check the video data file to determine if the video data file is incomplete or corrupt. Alternatively, the DVR may automatically check video data files to determine if the video data files are incomplete or corrupt. The DVR can send a recovery query to the backup server for the entire video data file or for a portion of the video data file that is missing or corrupt. The recovery query can include a start time for the portion of the video data file. Additionally, the recovery query can include a stop time for the portion of the video data file. Alternatively, the recovery query can include a duration, the amount of time between the start time and the stop time. The portion of the video data file can include a first segment encompassing the start time, a last segment encompassing the stop time, and any additional segments between the first segment and the last segment. The first segment may include video data prior to the start time. The last segment may include video data after the stop time. The first segment and the last segment can be the same segment.

As illustrated at 704, the server can determine if the request is valid. If the request is not valid, the server can deny the request as illustrated at 706. The request may be invalid because the server does not have the requested video data file. Alternatively, the request may be invalid because the subscriber does not have access to the video data file. For example, a subscriber may not have previously recorded the program. If the request is valid, i.e., the video data file exists and the subscriber has access to the video data file, the server can send the video data file to the DVR, as illustrated at 708. The DVR can store the video data file to the DVR storage, as illustrate at 710. At 712, the DVR can process the video data file to provide a video signal to a display, such as a TV monitor. A user can watch the program on the display, as illustrated at 714.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
receiving at a digital video recorder located at a user premises, a user input, the user input identifying a video signal, the video signal comprising a program to be recorded;
recording at the digital video recorder the video signal to a first video data file based on the user input;
sending from the digital video recorder an instruction to a backup server responsive to the user input to cause the backup server to record the video signal to a second video data file, the backup server being remote from the digital video recorder,
wherein the instruction comprises a recording schedule and subscriber information,
wherein the first video data file and the second video data file each include the program in its entirety,
wherein the backup server validates a recovery request for the second video data file according to the subscriber information,
wherein the sending of the instruction causes the backup server to store metadata that includes the subscriber information and that includes access control functions associated with the second video data file,
wherein a plurality of subscribers other than the user are provided access to the second video data file in accordance with the access control functions, and
wherein a subscriber other than the user is provided access to the second video data file based on whether the subscriber previously recorded the program;
detecting, by the digital video recorder, a corrupted portion of the first video data file stored at the digital video recorder;
sending, by the digital video recorder, a recovery query to the backup server to obtain a portion of the second video data file corresponding to the corrupted portion; and
accessing, by the digital video recorder, the second video data file using the metadata responsive to the detecting, wherein the accessing is limited to the portion without accessing a remainder of the second video data file.

2. The method of claim 1 further comprising:
responsive to the detecting of the corruption, sending to the backup server a request for the portion of the second video data file, wherein the request includes identification information to identify a requester of the second video file; and
retrieving the portion of the second video data file from the backup server responsive to the backup server validating the identification information according to the subscriber information.

3. The method of claim 2 wherein the portion of the second video data file is determined based on a start time and a stop time of a corresponding portion of the video signal.

4. The method of claim 3 wherein the metadata provides access control to the second video data file of the backup server, wherein the access control denies access by other subscribers to the second video data file where the other subscribers have not requested a backup version of the video signal.

5. The method of claim 4 wherein the portion of the second video data file includes a first segment encompassing the start time and a last segment encompassing the stop time.

6. A method, comprising:
receiving at a recording device a user input, the user input identifying a video signal, the video signal comprising a program to be recorded;
recording at the recording device the video signal to a video data file based on the user input, the video data file including the program in its entirety;
sending from the recording device the video data file and subscriber information to a backup server responsive to the user input, thereby providing a video data file at the backup server including the program in its entirety, the backup server being remote from the recording device,
wherein the backup server validates a recovery request for the video data file according to the subscriber information,
wherein the sending of the subscriber information causes the backup server to store metadata that includes the subscriber information and that includes access control functions associated with the video data file stored at the backup server,
wherein a plurality of subscribers other than the user are provided access to the video data file stored at the backup server, and
wherein a subscriber other than the user is provided access to the video data file at the backup server based on whether the subscriber previously recorded the program;
detecting, by the recording device, a corrupted portion of the video data file stored at the recording device; and
accessing, by the recording device, a portion of the video data file at the backup server corresponding to the corrupted portion using the metadata responsive to the detecting of the corruption,
wherein the accessing is in accordance with the recovery request and is limited to the portion without accessing a remainder of the video data file at the backup server.

7. The method of claim 6 further comprising:
sending to the backup server a request for the portion of the video data file, wherein the request includes identification information to identify a requester of the video file; and
retrieving the portion of the video data file from the backup server using the metadata responsive to the backup server validating the identification information according to the subscriber information.

8. The method of claim 7 wherein the portion of the video data file is determined based on a start time of a corresponding portion of the video signal.

9. The method of claim 8 wherein the portion of the video data file is determined based on a stop time of the corresponding portion of the video signal.

10. The method of claim 9 wherein the portion of the video data file includes a first segment encompassing the start time and a last segment encompassing the stop time.

11. A backup server for a digital video recorder, the backup server comprising:
a storage storing computer instructions; and
a processor coupled to the storage, wherein responsive to execution of the computer instructions, the processor performs operations comprising:
receiving an instruction from the digital video recorder, the instruction including program information and subscriber information for a first subscriber, the digital video recorder being remote from the backup server;
comparing the program information to program information of a subset of stored video data files within the storage, wherein the subset of stored video data files is limited to content stored by request of the first subscriber;

recording a video signal comprising a program to a video data file within the storage based on the program information, responsive to a comparison indicating that the video data file does not exist among the stored video data files, thereby providing a first stored video data file including the program in its entirety;

generating metadata for the first stored video data file, wherein the metadata includes the program information and includes access control functionality for the first stored video data file, wherein a second subscriber is provided access to the first stored video file in accordance with the access control functionality, wherein the second subscriber is provided access to the first stored data file based on whether the second subscriber previously recorded the program;

receiving a recovery instruction from the digital video recorder, wherein the recovery instruction comprises the program information, and identification information, wherein the recovery instruction is generated by the digital video recorder based on a detection by the digital video recorder of a corrupted portion of a second stored video data file stored at the digital video recorder and including the program in its entirety; and sending, in response to the recovery instruction, a portion of the first stored video data file corresponding to the corrupted portion of the second stored video data file without a remainder of the first stored video data file to the digital video recorder using the metadata responsive to validating the identification information according to the subscriber information.

12. The backup server of claim 11 wherein the operations further comprise validating the identification information according to the subscriber information prior to sending the portion of the first stored video data file to the digital video recorder.

13. The backup server of claim 11 wherein the operations further comprise receiving a second instruction from a second digital video recorder, the second instruction including a second program information.

14. The backup server of claim 13 wherein the operations further comprise recording a second video signal to another video data file based on the second program information, wherein the program information and the second program information are substantially different.

15. The backup server of claim 13 wherein the program information and the second program information are substantially similar.

16. The backup server of claim 11 wherein the recovery instruction includes a start time of the corrupted portion.

17. The backup server of claim 16 wherein the recovery instruction includes a stop time of the corrupted portion.

18. The backup server of claim 17 wherein the sent portion of the first stored video data file includes a first segment encompassing the start time and a last segment encompassing the stop time.

* * * * *